United States Patent
Sun et al.

(10) Patent No.: US 11,903,021 B2
(45) Date of Patent: Feb. 13, 2024

(54) TWO-STEP RANDOM ACCESS PHYSICAL UPLINK SHARED CHANNEL ALLOCATION OVER MULTIPLE RESOURCE BLOCK SETS

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/402,274

(22) Filed: Aug. 13, 2021

(65) Prior Publication Data

US 2022/0070919 A1 Mar. 3, 2022

Related U.S. Application Data

(60) Provisional application No. 63/071,330, filed on Aug. 27, 2020.

(51) Int. Cl.
*H04W 74/00* (2009.01)
*H04W 74/08* (2009.01)
*H04J 1/02* (2006.01)
*H04L 5/00* (2006.01)

(52) U.S. Cl.
CPC ............ *H04W 74/008* (2013.01); *H04J 1/02* (2013.01); *H04L 5/0098* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2020/0245373 A1* | 7/2020 | Xiong | H04L 27/2602 |
| 2021/0051707 A1* | 2/2021 | Rastegardoost | H04L 5/0051 |
| 2021/0219345 A1* | 7/2021 | Agiwal | H04W 74/0833 |
| 2022/0070919 A1* | 3/2022 | Sun | H04W 74/002 |
| 2022/0191935 A1* | 6/2022 | Xiong | H04W 74/0833 |
| 2022/0377813 A1* | 11/2022 | Wang | H04W 72/0453 |
| 2023/0085104 A1* | 3/2023 | Park | H04W 74/008 370/329 |
| 2023/0127054 A1* | 4/2023 | Lee | H04W 76/27 370/329 |

OTHER PUBLICATIONS

International Search Report and Written Opinion—PCT/US2021/046182—ISA/EPO—dated Dec. 8, 2021.

(Continued)

*Primary Examiner* — Faiyazkhan Ghafoerkhan
(74) *Attorney, Agent, or Firm* — Procopio, Cory, Hargreaves & Savitch LLP

(57) ABSTRACT

A UE receives a configuration for a message A (Msg A) physical random access channel (PRACH) over a resource block (RB) set for a two-step random access channel (RACH) operation and receives one or more parameters for a Msg A physical uplink shared channel (PUSCH) configuration. The UE transmits a Msg A in a configured Msg A PRACH occasion and a Msg A PUSCH resource based on an RB set for the Msg A PRACH and the one or more parameters for the Msg A PUSCH configuration.

32 Claims, 11 Drawing Sheets

(56) References Cited

OTHER PUBLICATIONS

Moderator (Qualcomm Incorporated): "FL Summary for Initial Access Signals and Channels for NR-U", Draft, 3GPP TSG RAN WG1 Meeting #102-e, R1-2007093, 3rd Generation Partnership Project (3GPP), Mobile Competence Centre, 650, Route Des Lucioles, F-06921 Sophia-Antipolis Cedex, France, vol. RAN WG1, No. Aug. 17, 2020-Aug. 24, 2020, Aug. 22, 2020 (Aug. 22, 2020), 10 Pages, URL: https://ftp.3gpp.org/tsg_ran/WG1_RL1/TSGR1_102-e/Docs/R1-2007093.zip. R1-2007093, 7.2.2.1.1, [Retrieved on Aug. 22, 2020] paragraph [03. 1]—paragraph [03.3].

Panasonic: "Discussion on Channel Structure for 2-Step RACH", 3GPP Draft, 3GPP TSG RAN WG1 #98bis, R1-1910775, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808264, 7 Pages, Retrieved from the Internet: URL: https://ftp.3gpp.org/tsg_ran/WG1_RL1/TSGR1_98b/Docs/R1-1910775.zip. R1-1910775.docx, [Retrieved on Oct. 4, 2019] Paragraph [0002] Appendi x A.

ZTE: "FL Summary #2 of Channel Structure for 2-Step RACH", Draft, 3GPP TSG RAN WG1 #98bis, R1-1911448, FL Summary #2 of Channel Structure for 2-Step RACH, 3rd Generation Partnership Project (3GPP), Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 22, 2019 (Oct. 22, 2019), XP051798714, 39 Pages, URL: https://ftp.3gpp.org/tsg_ran/WG1_RL1/TSGR1_98b/Docs/R1-1911448.zip. [Retrieved on Oct. 22, 2019) Paragraph [02. 1], paragraph [0003].

\* cited by examiner

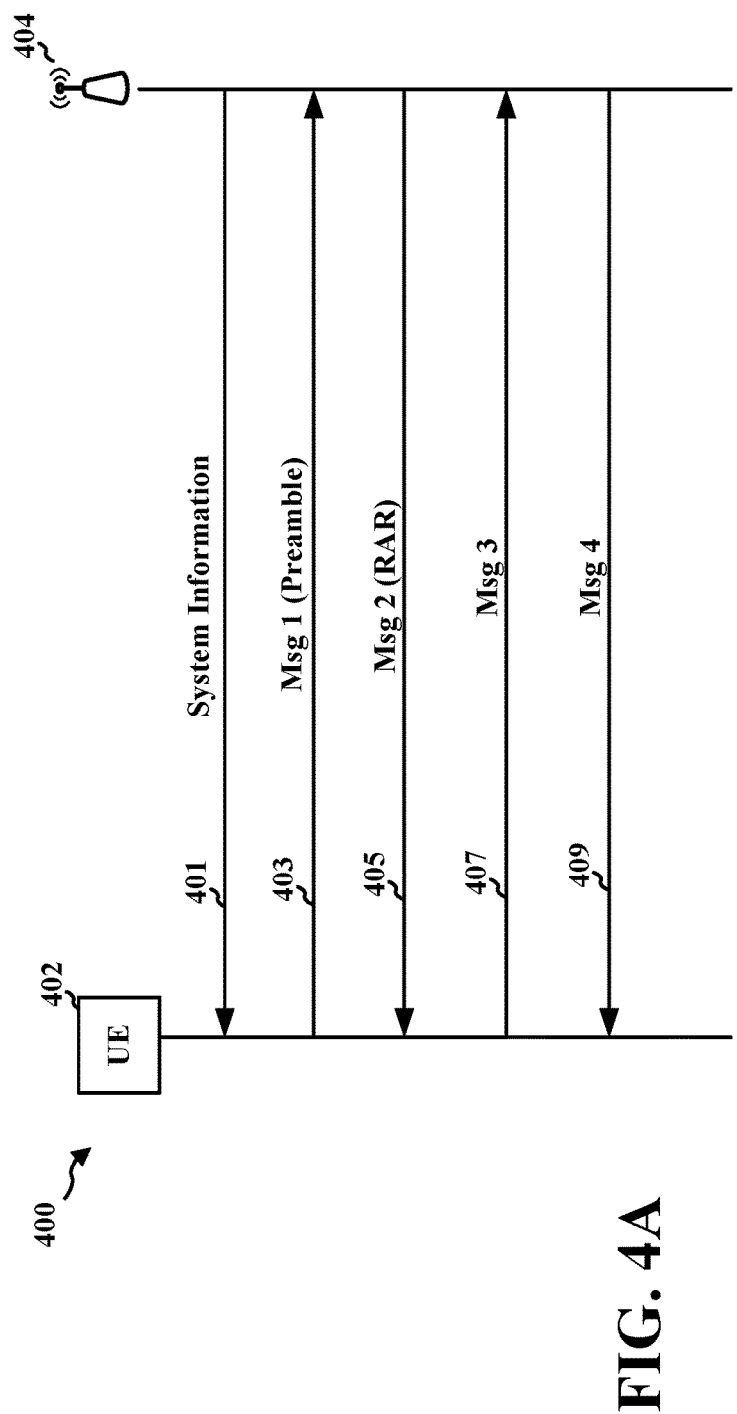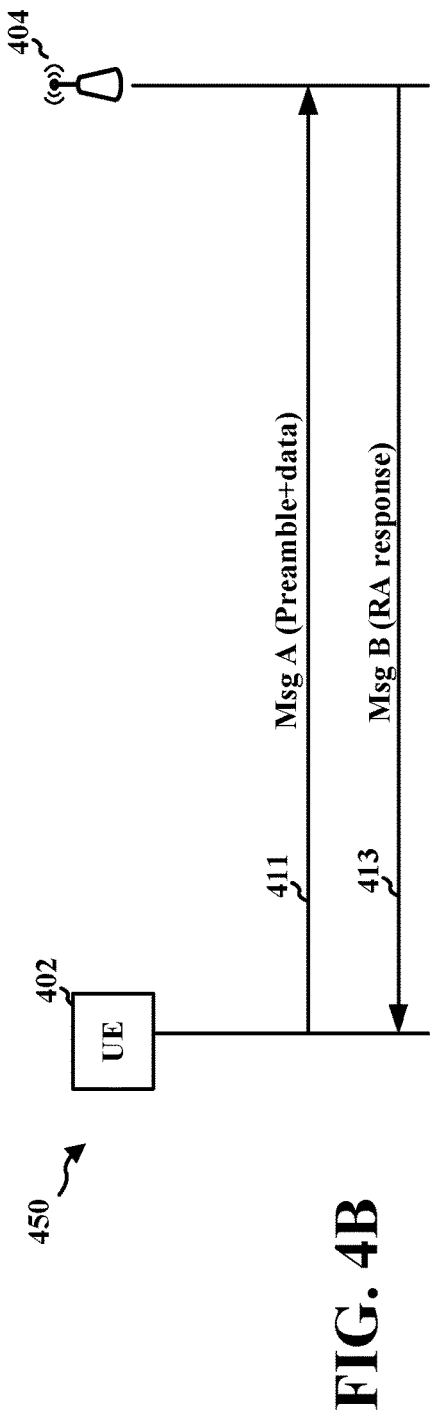
FIG. 4A
FIG. 4B

TWO-STEP RANDOM ACCESS PHYSICAL UPLINK SHARED CHANNEL ALLOCATION OVER MULTIPLE RESOURCE BLOCK SETS

CROSS REFERENCE TO RELATED APPLICATION(S)

This application claims the benefit of and priority to U.S. Provisional Application Ser. No. 63/071,330, entitled "Two-Step Random Access Physical Uplink Shared Channel Allocation Over Multiple Resource Block Sets" and filed on Aug. 27, 2020, which is expressly incorporated by reference herein in its entirety.

TECHNICAL FIELD

The present disclosure relates generally to communication systems, and more particularly, to wireless communication including random access.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A UE receives a configuration for a message A (Msg A) physical random access channel (PRACH) over a resource block (RB) set for a two-step random access channel (RACH) operation and receives one or more parameters for a Msg A physical uplink shared channel (PUSCH) configuration. The UE transmits a Msg A in a configured Msg A PRACH occasion and a Msg A PUSCH resource based on an RB set for the Msg A PRACH and the one or more parameters for the Msg A PUSCH configuration.

In another aspect of the disclosure, a method, a computer-readable medium, and an apparatus are provided. A base station transmits a configuration for a Msg A PRACH over an RB set for a two-step RACH operation and indicates one or more parameters for a Msg A PUSCH configuration. The base station receives a Msg A in a configured Msg A PRACH occasion and an identified Msg A PUSCH resource based on the RB set configured for the Msg A PRACH and the one or more parameters for the Msg A PUSCH configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates an example of a 4-step random access procedure.

FIG. 4B illustrates an example of a 2-step random access procedure.

DETAILED DESCRIPTION

Figure 1:
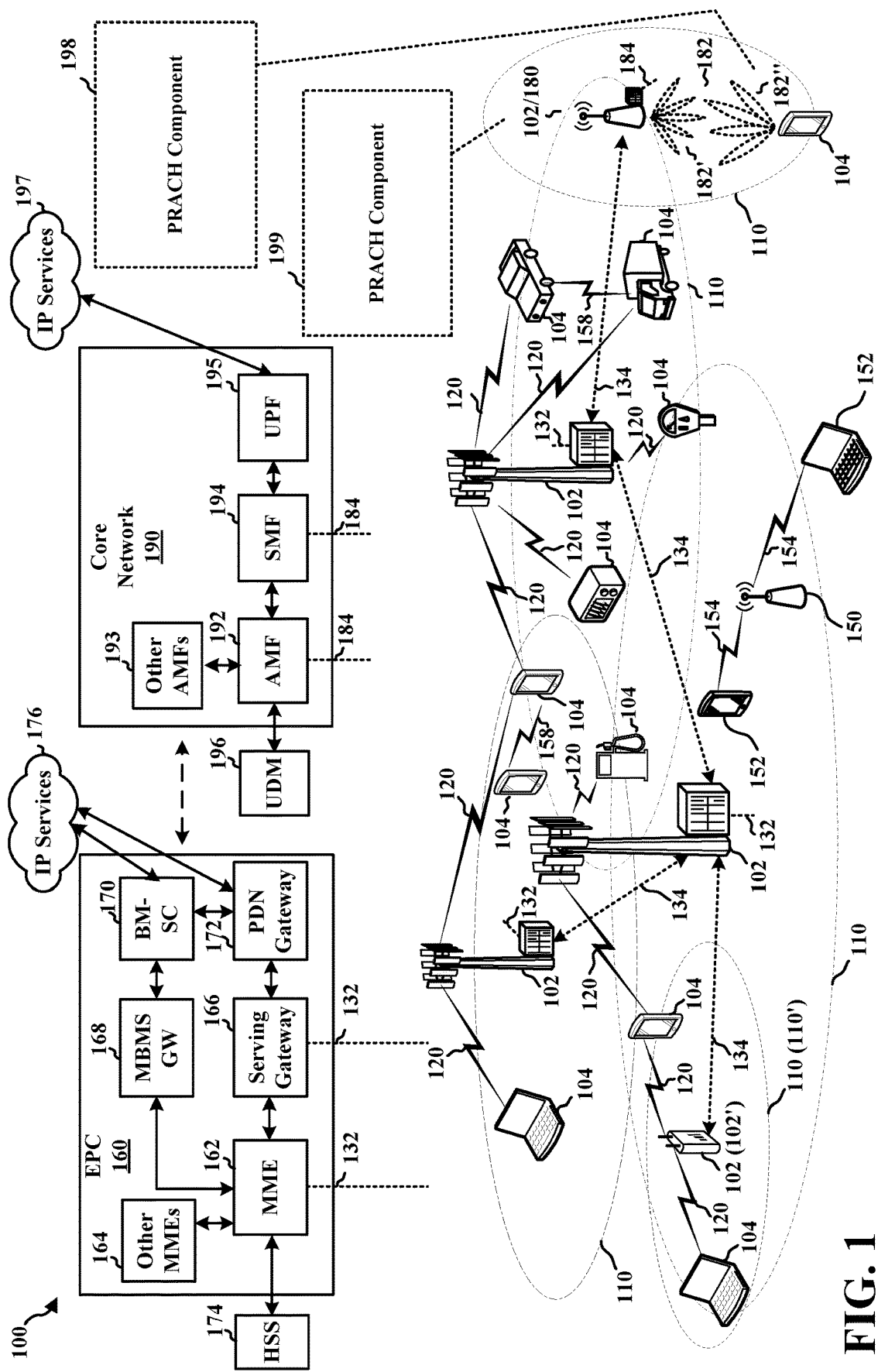
FIG. 1 is a diagram illustrating an example of a wireless communications system and an access network.

Random access may be performed in a shared spectrum. In some aspects, the RB set size may correspond to the listen-before-talk (LBT) unit. For initial access, the uplink (UL) bandwidth part (BWP) may correspond to a single RB set. Thus, the PRACH resources for initial access may be mapped based on a single RB set based on the initial uplink BWP. For a connected mode UE, the PRACH configuration may include multiple RB sets corresponding to an active UL BWP that is wider than the initial UL BWP. The use of multiple RBs may help to spread the random access from connected mode UEs across a wider frequency range and may help to avoid collisions among UEs. Multiple random access occasions (ROs) in different RB sets in a frequency domain may help to distribute the PRACH loading and provide LBT diversity. For example, if a UE fails LBT in RB set 0 and passes LBT in RB set 1, the UE may send PRACH in RB set 1.

However, Msg A PUSCH resources that cover a boundary of multiple RB sets may cause the UE to attempt to pass LBT in both RB sets in order to transmit the Msg A PUSCH. The UE may wait to pass LBT for both RB set 1 and RB set 2 in order to transmit the Msg A PUSCH in the resources 502. Aspects presented herein enable Msg A PUSCH resources to be identified within each RB set so that a Msg A PUSCH resource does not overlap a boundary between two different RB sets. The aspects presented herein enable a UE to identify Msg A PUSCH resources with a minimal amount of LBT to be successful in order to transmit the Msg A PUSCH, the identification based on an RB associated with a particular RO. For example, the UE may receive a configuration for a Msg A PRACH over an RB set for a two-step RACH operation and may receive one or more parameters for a Msg A PUSCH configuration. The UE transmits a Msg A in a configured Msg A PRACH occasion and a Msg A PUSCH resource based on an RB set for the Msg A PRACH and the one or more parameters for the Msg A PUSCH configuration.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PRACH component 198 configured to receive a configuration for a Msg A PRACH over an RB set for a two-step RACH operation, receive one or more parameters for a Msg A PUSCH configuration, and to identify Msg A PUSCH resources based on the RB set configured for the Msg A PRACH and the one or more parameters for the Msg A PUSCH configuration. The UE 104 may be configured to transmit a Msg A in a configured Msg A PRACH occasion and one of the identified Msg A PUSCH resource based on an RB set for the Msg A PRACH and the one or more parameters for the Msg A PUSCH configuration.

The base station 102 or 180 may include a PRACH component 199 that is configured to transmit a configuration for a Msg A PRACH over an RB set for a two-step RACH operation and indicate one or more parameters for a Msg A PUSCH configuration. The base station may be configured to receive a Msg A in a configured Msg A PRACH occasion and an identified Msg A PUSCH resource based on the RB set configured for the Msg A PRACH and the one or more parameters for the Msg A PUSCH configuration.

Although the following description may be focused on 5G NR, the concepts described herein may be applicable to other similar areas, such as LTE, LTE-A, CDMA, GSM, and other wireless technologies.

Figure 2:
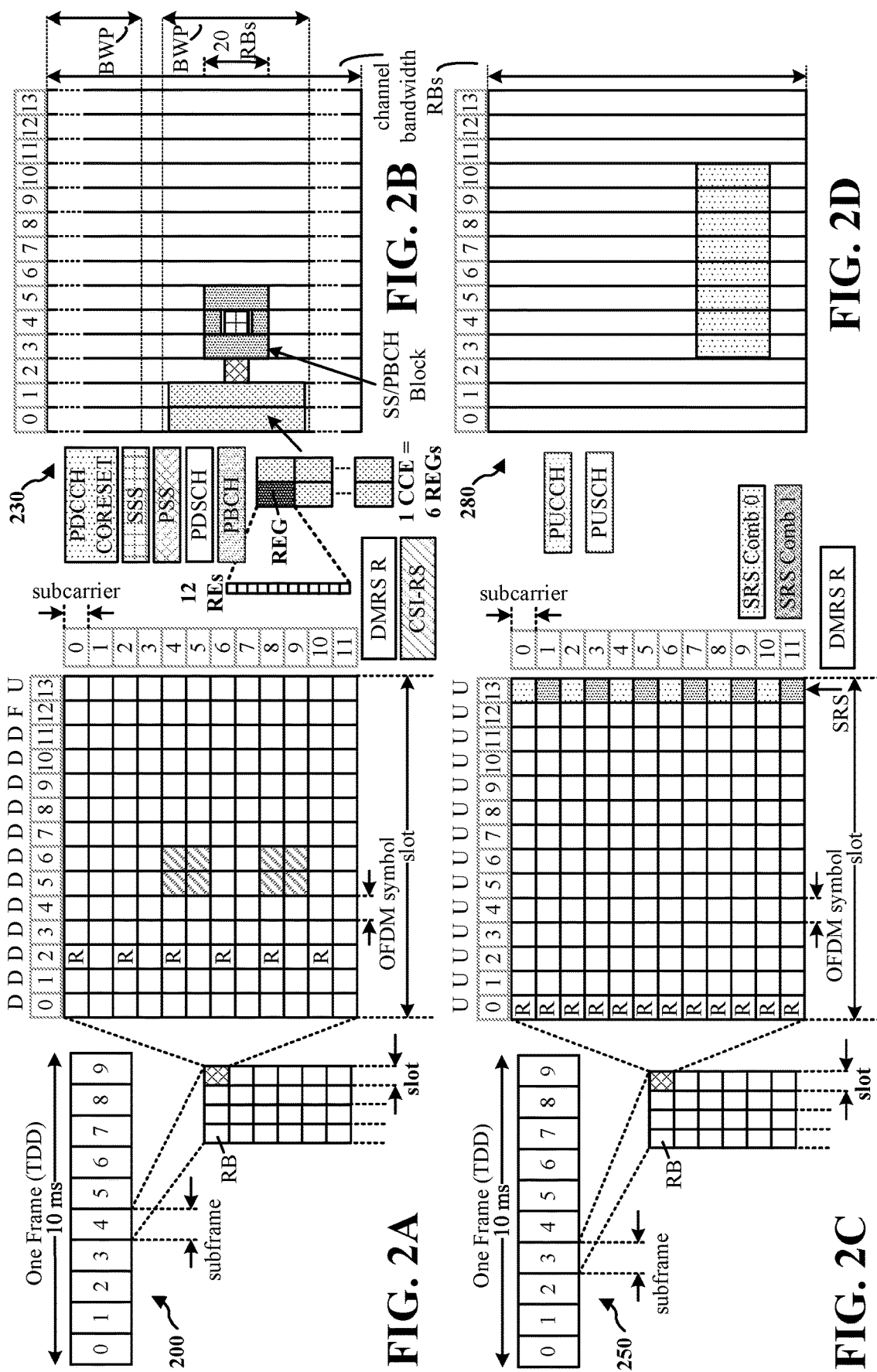
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description also applies to a 5G NR frame structure that is TDD.

FIGS. 2A-2D illustrate a frame structure, and the aspects of the present disclosure may be applicable to other wireless communication technologies may have different frame structures and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on the cyclic prefix (CP) is normal or extended. For normal CP, each slot may include 14 symbols, and for extended CP, each slot may include 12 symbols. The symbols on DL may be CP orthogonal frequency division multiplexing ((OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and CP. The numerology defines the subcarrier spacing (SCS) and, effectively, the symbol length/duration, which is equal to 1/SCS.

| μ | SCS $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (e.g., 14 symbols per slot), different numerologies μ 0 to 4 allow for 1, 2, 4, 8, and 16 slots, respectively, per subframe. For extended CP, the numerology 2 allows for 4 slots per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
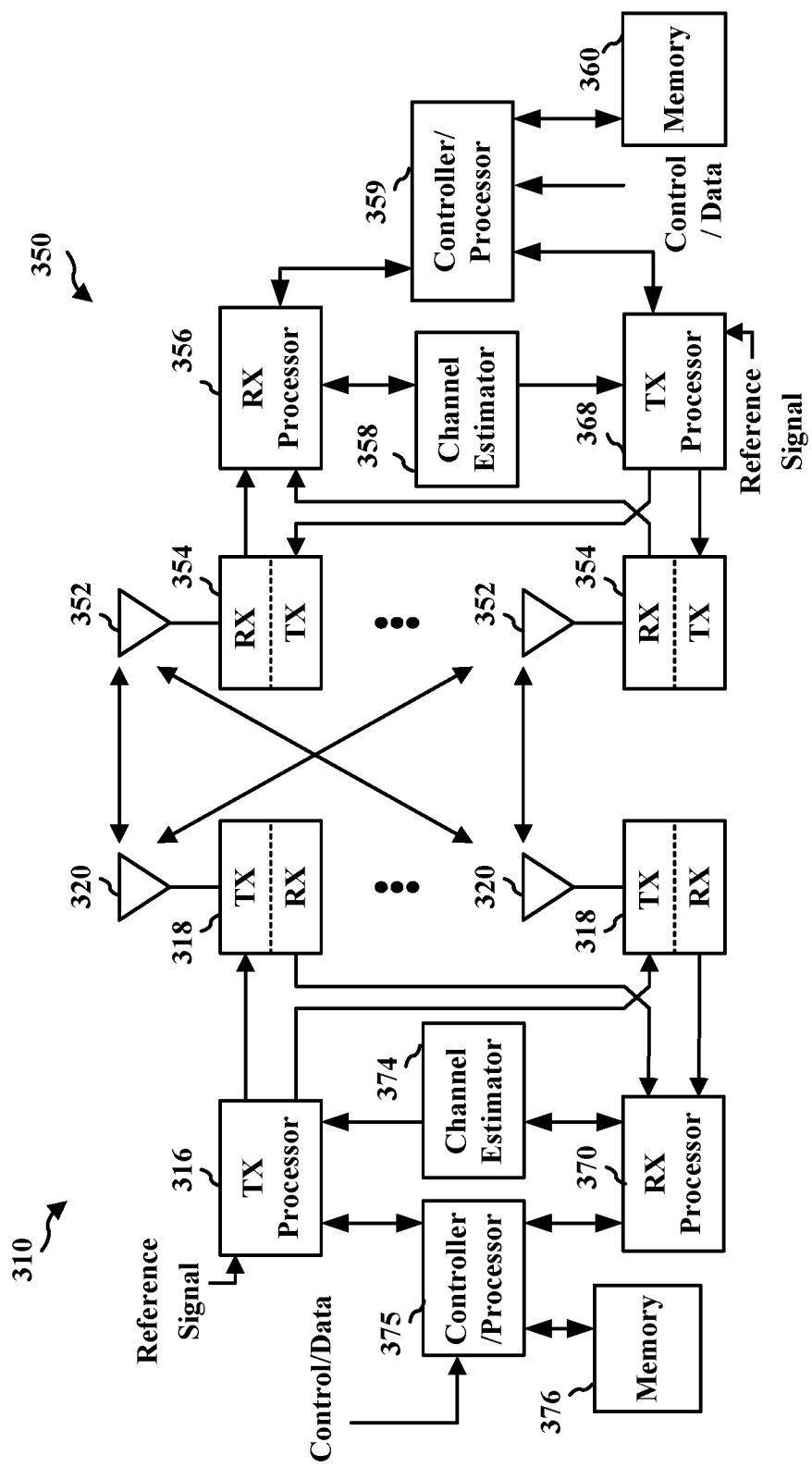
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PRACH component 198 of FIG. 1.

At least one of the TX processor 316, the RX processor 370, and the controller/processor 375 may be configured to perform aspects in connection with the PRACH component 199 of FIG. 1.

A UE may use a random access procedure in order to communicate with a base station. For example, the UE may use the random access procedure to request an RRC connection, to re-establish an RRC connection, resume an RRC connection, etc. FIG. 4A illustrates example aspects of a random access procedure 400 between a UE 402 and a base station 404. The UE 402 may initiate the random access message exchange by sending, to the base station 404, a first random access message 403 (e.g., Msg 1) including a preamble. Prior to sending the first random access message 403, the UE may obtain random access parameters, e.g., including preamble format parameters, time and frequency resources, parameters for determining root sequences and/or cyclic shifts for a random access preamble, etc., e.g., in system information 401 from the base station 404. The preamble may be transmitted with an identifier, such as a Random Access RNTI (RA-RNTI). The UE 402 may randomly select a random access preamble sequence, e.g., from a set of preamble sequences. If the UE 402 randomly selects the preamble sequence, the base station 404 may receive another preamble from a different UE at the same time. In some examples, a preamble sequence may be assigned to the UE 402.

The base station responds to the first random access message 403 by sending a second random access message 405 (e.g. Msg 2) using PDSCH and including a random access response (RAR). The RAR may include, e.g., an identifier of the random access preamble sent by the UE, a time advance (TA), an uplink grant for the UE to transmit data, cell radio network temporary identifier (C-RNTI) or another identifier, and/or a back-off indicator. Upon receiving the RAR (e.g., 405), the UE 402 may transmit a third random access message 407 (e.g., Msg 3) to the base station 404, e.g., using PUSCH, that may include a RRC connection request, an RRC connection re-establishment request, or an RRC connection resume request, depending on the trigger for the initiating the random access procedure. The base station 404 may then complete the random access procedure by sending a fourth random access message 409 (e.g., Msg 4) to the UE 402, e.g., using PDCCH for scheduling and PDSCH for the message. The fourth random access message 409 may include a random access response message that includes timing advancement information, contention resolution information, and/or RRC connection setup information. The UE 402 may monitor for PDCCH, e.g., with the C-RNTI. If the PDCCH is successfully decoded, the UE 402 may also decode PDSCH. The UE 402 may send HARQ feedback for any data carried in the fourth random access message. If two UEs sent a same preamble at 703, both UEs may receive the RAR leading both UEs to send a third random access message 407. The base station 404 may resolve such a collision by being able to decode the third random access message from only one of the UEs and responding with a fourth random access message to that UE. The other UE, which did not receive the fourth random access message 409, may determine that random access did not succeed and may re-attempt random access. Thus, the fourth message may be referred to as a contention resolution message. The fourth random access message 409 may complete the random access procedure. Thus, the UE 402 may then transmit uplink communication and/or receive downlink communication with the base station 404 based on the RAR and fourth random access message 409.

In order to reduce latency or control signaling overhead, a single round trip cycle between the UE and the base station may be achieved in a 2-step RACH process 450, such as shown in FIG. 4B. Aspects of Msg 1 and Msg 3 may be combined in a single message, e.g., which may be referred to as Msg A. The Msg A may include a random access preamble, and may also include a PUSCH transmission, e.g., such as data. The Msg A preambles may be separate from the four step preambles, yet may be transmitted in the same ROs as the preambles of the four step RACH procedure or may be transmitted in separate ROs. An RO includes time and frequency resources in which the UE can transmit a PRACH. The PUSCH transmissions may be transmitted in POs that may span multiple symbols and PRBs. A PO includes time and frequency resources in which the UE can transmit a PUSCH. After the UE 402 transmits the Msg A 411, the UE 402 may wait for a response from the base station 404. Additionally, aspects of the Msg 2 and Msg 4 may be combined into a single message, which may be referred to as Msg B. Two step RACH may be triggered for reasons similar to a four-step RACH procedure. If the UE does not receive a response, the UE may retransmit the Msg A or may fall back to a four-step RACH procedure starting with a Msg 1. If the base station detects the Msg A, but fails to successfully decode the Msg A PUSCH, the base station may respond with an allocation of resources for an uplink retransmission of the PUSCH. The UE may fall back to the four step RACH with a transmission of Msg 3 based on the response from the base station and may retransmit the PUSCH from Msg A. If the base station successfully decodes the Msg A and corresponding PUSCH, the base station may reply with an indication of the successful receipt, e.g., as a random access response 413 that completes the two-step RACH procedure. The Msg B may include the random access response and a contention-resolution message. The contention resolution message may be sent after the base station successfully decodes the PUSCH transmission.

For the two-step RACH procedure, a set of PUSCH resources may be configured for each PRACH slot. A base station may transmit a Msg A PUSCH configuration to a UE that provides an offset from a lowest RB of the first PUSCH to PRB 0, e.g., in a parameter such as a frequency start parameter for Msg A PUSCH (for example "frequencyStartMsgA-PUSCH") when a non-interlaced waveform is used. If an interlaced waveform is used by the UE for the Msg A PUSCH, the base station may provide the first interleave index. The base station may provide the frequency start parameter and/or the first interlace index in RRC signaling, for example. A PO for a non-interlaced waveform may be defined by a starting offset (e.g., from a reference PRB such as PRB 0), a number of RBs for each PO, a guard band parameter indicating whether there is a guard band between POs (which may be configured as 0 RBs or 1 RB), and a number of frequency domain POs. The number of frequency domain POs may be configured as 1, 2, 4, or 8, for example. A PO for an interlaced waveform may be defined by a starting interlace (e.g., "interleaveIndexFirstPO-MsgA-PUSCH") and a number of interlaces (e.g., "nrofinterlacesPerMsgA-PO").

Aspects may also be applied for unlicensed communication in a shared spectrum, such as NR unlicensed (NR-U) in an unlicensed frequency spectrum. In NR-U, as an example, an RB set may be about 20 MHz and may be the listen-before-talk (LBT) unit. For initial access, the uplink (UL) bandwidth part (BWP) may be 20 MHz, e.g., corresponding to a single RB set. Thus, the PRACH resources for initial access are mapped based on a single RB set. For PRACH for initial access, the PRACH may be constrained by the initial uplink BWP.

For a connected mode UE, the PRACH configuration may include multiple RB sets, e.g., when the active UL BWP is wider than 20 MHz. The use of multiple RBs may help to spread the random access from connected mode UEs across a wider frequency range and may help to avoid collisions among UEs. From efficient resource utilization point of view, the PRACH resource for a connected mode UE (to include multiple RB sets) may be a super set of the PRACH resources for an idle UE. For example, for initial access, the UE may use PRACH in RB set 0 and in a connected mode, the UE may use PRACH in RB set 0/1/2/3 (e.g., a superset including RB set 0 and additional RB sets).

The multiple ROs in the frequency domain in different RB sets may help to distribute the PRACH loading and provide LBT diversity. For example, if a UE fails LBT in RB set 0 and passes LBT in RB set 1, the UE may send PRACH in RB set 1.

Figure 5:
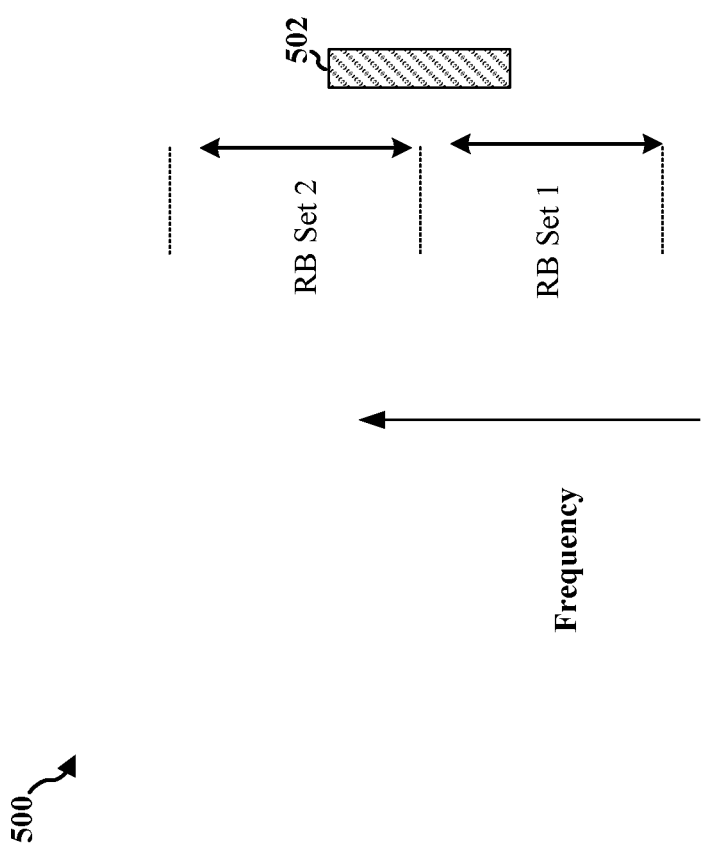
FIG. 5 illustrates an example of a PUSCH occasion that overlaps a boundary between two RB sets.

However, Msg A PUSCH resources that cover a boundary of multiple RB sets may cause the UE to attempt to pass LBT in both RB sets in order to transmit the Msg A PUSCH. In the example resource diagram 500 in FIG. 5, the Msg A PUSCH resources 502 overlaps the boundary between RB set 1 and RB set 2. Thus, the UE may wait to pass LBT for both RB set 1 and RB set 2 in order to transmit the Msg A PUSCH in the resources 502.

Aspects presented herein enable Msg A PUSCH resources to be identified within each RB set so that a Msg A PUSCH resource does not overlap a boundary between two different RB sets. Thus, the aspects of the present application may enable a UE to identify Msg A PUSCH resources that do not involve an additional amount of LBT to be successful in order to transmit the Msg A PUSCH.

As with a Msg 2 PRACH configuration, the 2-step MsgA PUSCH configuration for RACH may provide an offset from the lowest RB of first PUSCH to PRB 0 by an offset parameter such as a "frequencyStartMsgA-PUSCH" parameter when non-interlaced waveform is used, or may provide the first interlace index when an interlaced waveform is used. The Msg A PUSCH configuration may not address multiple RB sets and may apply only to a single RB set configuration.

Figure 6A:
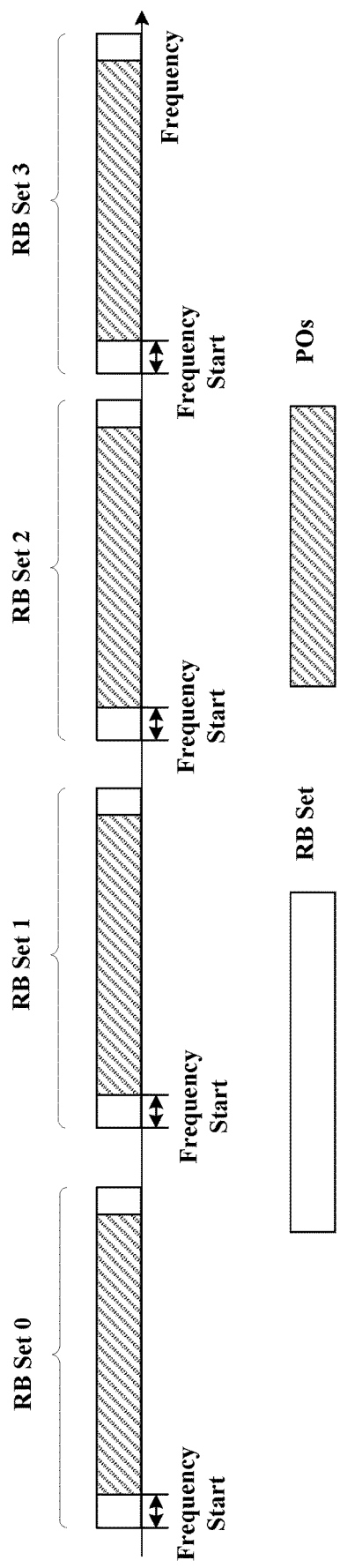
FIGS. 6A and 6B illustrate frequency offsets for PUSCH occasions (POs) in multiple RB sets.
Figure 6B:
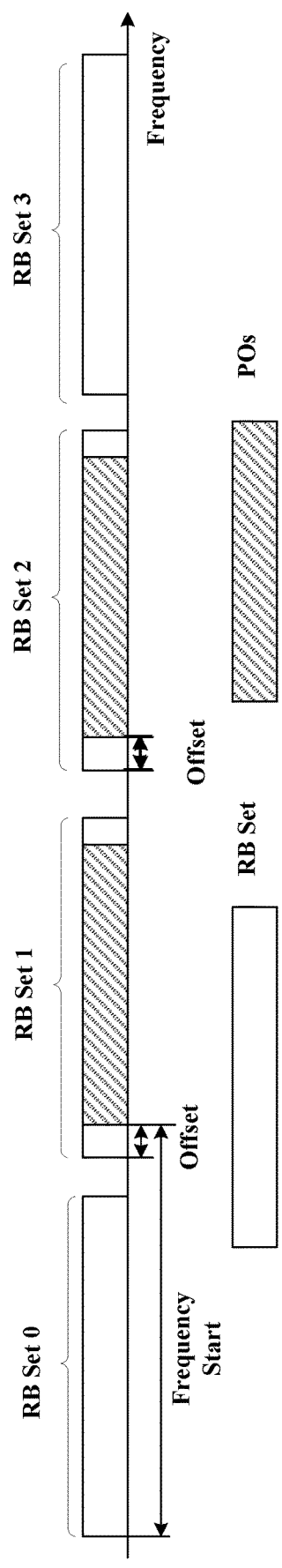

When a non-interlaced PUSCH waveform is used, the frequency start for the PUSCH may be interpreted as a frequency start in each RB set. FIG. 6A illustrates an example of the application of the frequency offset in the first option to multiple RB sets. In a second option, a design may be used that includes two indications or offsets. For example, the UE may identify the offset between the PUSCH starting point indicated by the frequency start parameter and a lower end of the RB set in which the first PUSCH falls. The UE may apply the same offset to the next RB sets, if the first RB set cannot hold all the frequency domain PUSCH occasions configured for the UE. FIG. 6B illustrates an example of the second option including the first offset and the second offset. Within each RB set, the integer number of POs may be filled in. Filling in may stop if the POs exceed the range of RB set.

If the interlaced PUSCH waveform is used, in a first option, another RRC parameter may indicate the starting RB set index. For example, the Msg A PUSCH may start from that RB set indicated by the starting RB set index. For example, for an RB set index of 1, the MsgA PUSCH occasion may be defined starting from RB set 1, and may continue in RB set 2, etc., if RB set 1 cannot hold all frequency domain POs. In a second option, a starting interlace index may indicate the starting interlace index over all of the RB sets, e.g., of multiple RB sets. For a 15/30 KHz waveform, there may be M=10/5 interlaces, respectively. The starting interlace may be in a range of 1-10 (e.g., 0-9) range. In order to indicate the starting interlace over multiple RB sets, the interlace index may be changed to a range of 0-39 or 49. The starting interlace of X may indicate a starting interlace starting from an RB set floor of X/M with an interlace of mod(X/M). For example, if X=11 and M=10, the indication starts from RB set 1 and interlace 1. In order to restrict the MsgA PUSCH in one RB set, a further restriction may be applied to filling POs if a PO exceeds the number of interlaces available in an RB set, and the placement may move to the next RB set.

The examples may include added RRC signaling in order to provided one or more additional Msg A PUSCH parameters to the UE. Aspects presented herein enable a UE to identify Msg A PUSCH resources that do not overlap a boundary between RB sets with more efficient RRC signaling, e.g., without additional RRC parameters for multiple RB set RACH configurations compared to a single RB set RACH configuration.

Figure 11:
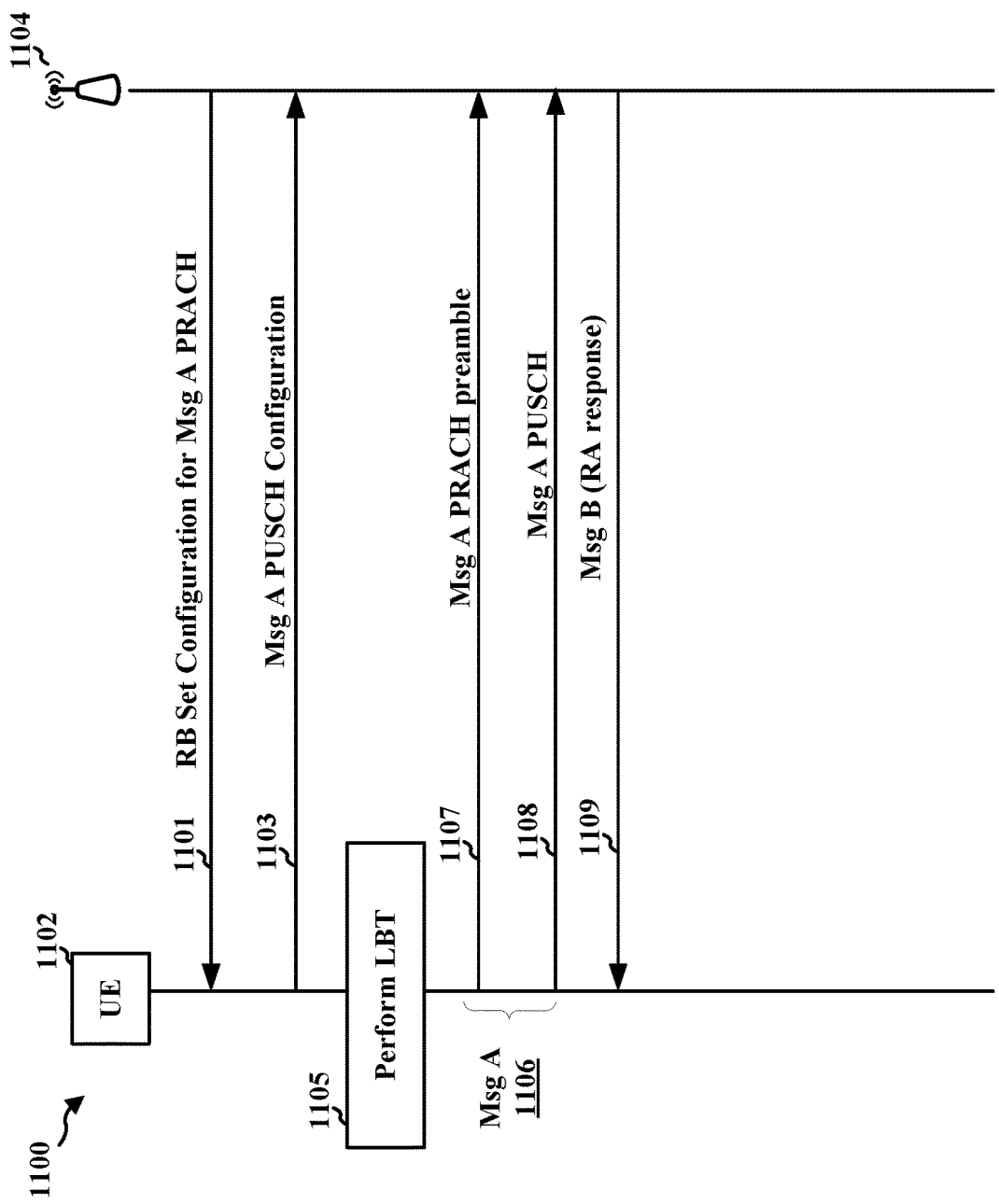
FIG. 11 illustrates an example communication flow diagram between a UE and a base station including the transmission of a Msg A PUSCH based on an RB set configured for the corresponding Msg A PRACH.

FIG. 11 illustrates an example communication flow diagram 1100 between a UE 1102 and a base station 1104 including the transmission of a Msg A PUSCH based on an RB set configured for the corresponding Msg A PRACH. As illustrated at 1101, the UE 1102 may receive a configuration for multiple RB sets for PRACH transmission, e.g., one RB set associated with each RO. For example, there may be multiple RB sets configured for a communication system, a carrier, or a bandwidth. One or more of the RB sets may be configured for a particular RACH occasion.

At 1103, the UE may receive a configuration of one or more parameters for Msg A PUSCH. At 1105, the UE may perform LBT, and if successful may proceed to transmit the Msg A 1106. The Msg A may include a PRACH preamble (e.g., 1107) based on the PRACH configuration received at 1101. The Msg A may include a Msg A PUSCH 1108 based on the RB set configured for the corresponding PRACH, at 1101, and the parameter(s) configured for the Msg A PUSCH, at 1103. As described in connection with FIG. 4B, the UE may receive a Msg B 1109 from the base station 1104 in response to the Msg A 1106.

When an interlaced waveform is used for a Msg A PUSCH, the UE 1102 may use the set of RB sets configured for MsgA PRACH, at 1101, to identify the Msg A PUSCH resources. The UE 1102 may receive the set of RB sets in a RO configuration and may determine the RB set for Msg A PUSCH, based on the RB set for the corresponding PRACH, without an additional RRC parameter. The UE 1102 may interpret the RRC parameters that define the Msg A PUSCH occasions within each RB set of the set of RBs configured for the Msg A PRACH. Thus, the UE may apply the PUSCH parameters configured (e.g., at 1103) for the Msg A PUSCH 1108 to an RB set configured (e.g., at 1101) for the corresponding Msg A PRACH 1107. As noted above, the Msg A PUSCH configuration 1103 may include a starting interlace and number of interlaces per Msg A PO. These parameters indicate the starting interlace in each RB set and the number of interlaces for each Msg A PUSCH resource. For multiple RB sets, the UE 1102 may reinterpret the number of frequency division multiplexed (FDM) POs as a number of interlace based POs for an RB set. The UE 1102 may repeat the process for each RB set with RO defined.

When a non-interlaced waveform is used for a Msg A PUSCH, for the RB set to be used, the UE 1102 may similarly use the RB set configured for the Msg A PRACH 1107. The UE 1102 may reinterpret the RRC parameters (e.g., configured at 1103) for the PUSCH occasions to be within an RB set of the multiple RB sets configured at 1101. For example, the UE may interpret the RRC configured parameters for the Msg A PUSCH 1108 within the RB set of the corresponding PRACH 1107. The UE 1102 may interpret the starting offset parameter from an RB set lower bound rather than from PRB 0. The UE 1102 may interpret the number of RBs for each PO in the same manner for a single RB set PRACH configuration and a multiple RB set configuration. For example, FIG. 6A illustrates an example in which the UE 1102 applies the starting offset to each RB set as an offset from the lowest RB of the corresponding RB set. The UE 1102 may interpret the configured parameter regarding a number of RBs for a guard band between POs (e.g., 0 or 1 RB) in the same manner for a single RB set PRACH configuration and a multiple RB set configuration. The UE 1102 may interpret the configured number of frequency domain POs (e.g., 1/2/4/8) as a number of POs in each RB set rather than an overall number of POs. For example, if the PRACH configuration includes 2 RB sets and the UE receives a configuration of 4 frequency domain POs for the Msg A PUSCH, the UE may have 8 overall POs, e.g., 4 in each RB set.

Figure 7:
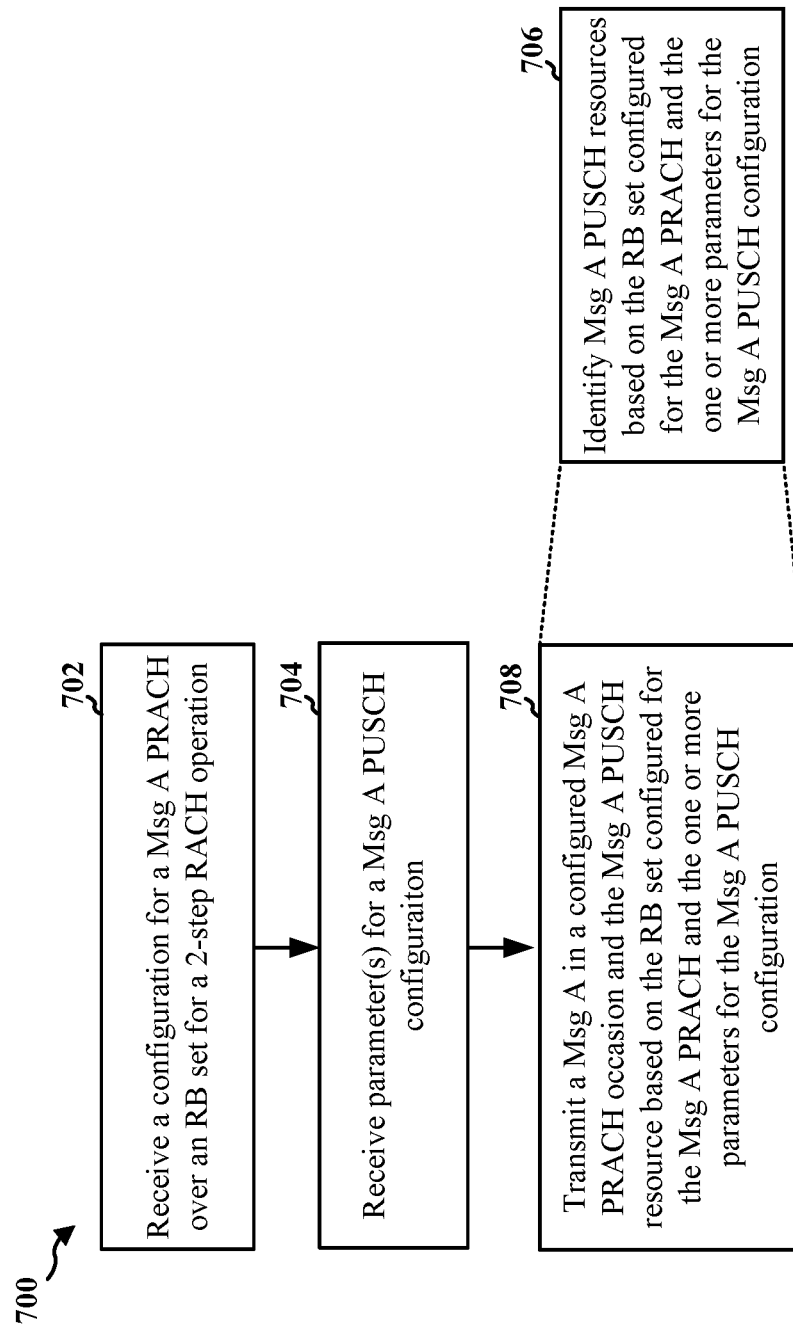
FIG. 7 is a flowchart of a method of wireless communication including transmission of a Msg A PUSCH using resources based at least in part on an RB set configured for a Msg A PRACH.

FIG. 7 is a flowchart 700 of a method of wireless communication. The method may be performed by a UE (e.g., the UE 104, 350, 402). The method may provide a more efficient manner for a UE to determine Msg A PUSCH resources with reduced signaling overhead and avoiding LBT in multiple RBs.

At 702, the UE receives a configuration for a Msg A PRACH over an RB set for a two-step RACH operation. The reception may be performed, e.g., by the Msg A PRACH component 840 via the reception component 830 and/or RF transceiver 822. There may be multiple RB sets configured for a communication system, a carrier, or a bandwidth. One or more of the RB sets may be configured for a particular RACH occasion.

At 704, the UE receives one or more parameters for a Msg A PUSCH configuration. The reception may be performed, e.g., by the Msg A PUSCH component 842 via the reception component 830 and/or RF transceiver 822. In some aspects, the one or more parameters may include a starting interlace for the Msg A PUSCH, a number of interlaces for the Msg A PUSCH, and/or a number of FDM POs for the Msg A PUSCH for an interlaced waveform. In some aspects, the one or more parameters may include at least one of a starting offset for the Msg A PUSCH, a number of resource blocks, a guard band between POs, or a number of FDM POs for the Msg A PUSCH for a non-interlaced waveform.

At 708, the UE transmits a Msg A in a configured Msg A PRACH occasion and a Msg A PUSCH resource, the Msg A PUSCH resource being based on the RB set configured for the Msg A PRACH and the one or more parameters for the Msg A PUSCH configuration. The transmission may be performed, e.g., by the transmission component 834 of the apparatus 802. In some aspects, as illustrated at 706, the UE may identify the Msg A PUSCH resource based on the RB set configured for the Msg A PRACH and the one or more parameters for the Msg A PUSCH configuration. The identification may be performed, e.g., by the resource identification component 844 of the apparatus 802.

The Msg A PUSCH may comprise an interlaced waveform. The one or more parameters for the Msg A PUSCH configuration may include at least one of a starting interlace for the Msg A PUSCH, a number of interlaces for the Msg A PUSCH, or a number of FDM POs for the Msg A PUSCH. The UE may apply the starting interlace as the starting interlace in the RB set configured for the Msg A PRACH. The UE may apply the number of interlaces for the Msg A PUSCH as the number of interlaces in the RB set configured for the Msg A PRACH. The UE may apply the number of FDM POs for the Msg A PUSCH as the number of FDM POs as a number of interlace based POs in the RB set configured for the Msg A PRACH.

The Msg A PUSCH may comprise a non-interlaced waveform. The one or more parameters may include at least one of a starting offset for the Msg A PUSCH, a number of resource blocks, a guard band between POs, or a number of FDM POs for the Msg A PUSCH. The UE may apply the starting offset as a frequency start for the Msg A PUSCH from a lowest resource block in the RB set configured for the Msg A PRACH. The UE may apply the number of FDM POs for the Msg A PUSCH as a number of POs in the RB set configured for the Msg A PRACH.

Figure 8:
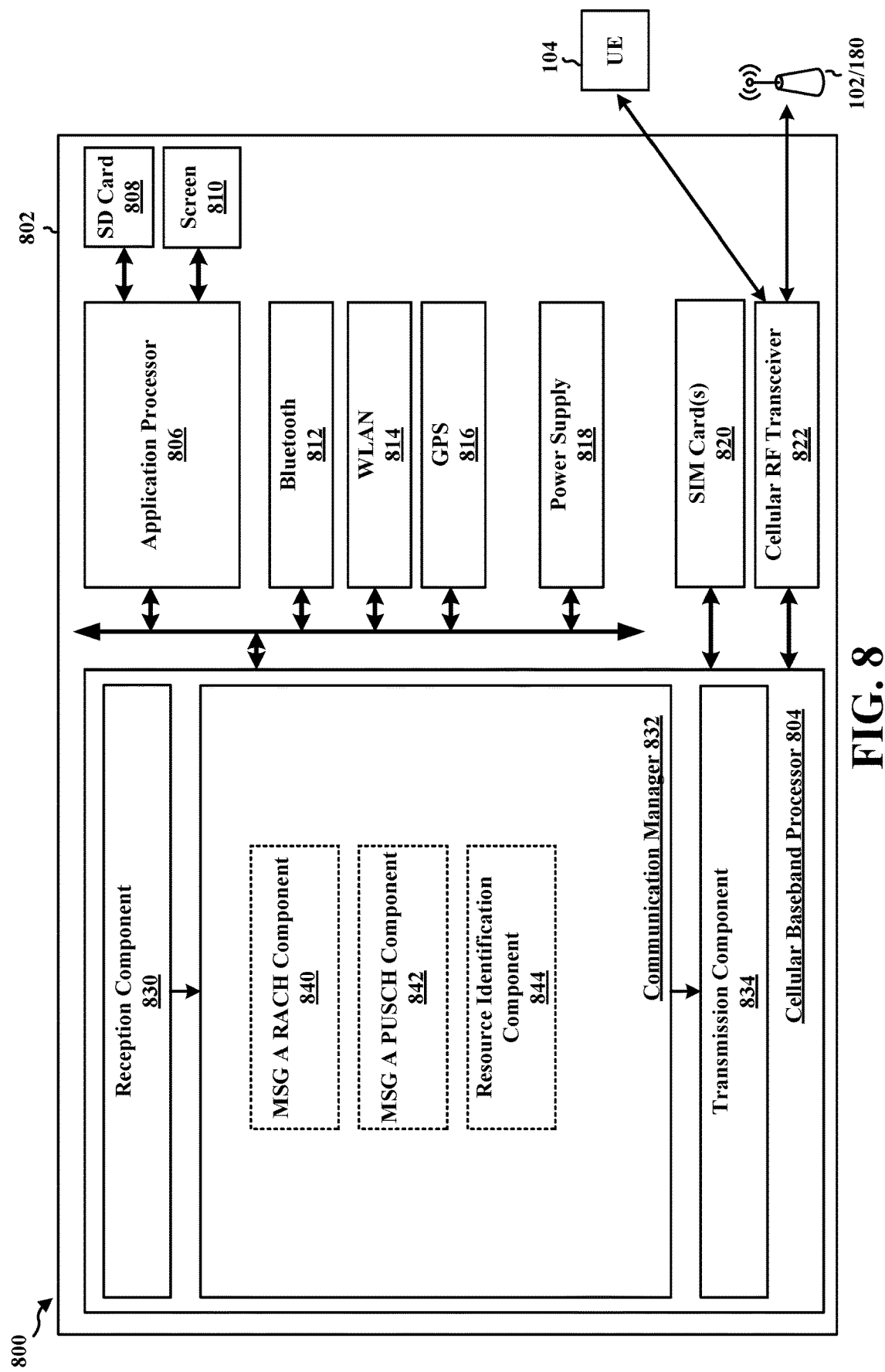
FIG. 8 is a diagram illustrating an example of a hardware implementation for an example apparatus.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described herein. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes a Msg A PRACH component 840 that is configured to receive a configuration for a Msg A PRACH over an RB set for a two-step RACH operation, e.g., as described in connection with 702 in FIG. 7. The communication manager 832 further includes a Msg A PUSCH component 842 that receive one or more parameters for a Msg A PUSCH configuration, e.g., as described in connection with 704 in FIG. 7. The communication manager 832 may further include a resource identification component 844 that receives input in the form of the RB set configured for the two-step PRACH operation from the component 840 and the one or more parameters for the Msg A PUSCH configuration from the component 842 and is configured to identify one or more resources for the Msg A PUSCH transmission based on the RB set configured for the Msg A PRACH and the one or more parameters configured for the Msg A PUSCH, e.g., as described in connection with 706 in FIG. 7. The transmission component 834 is configured to transmit a Msg A PUSCH in a configured Msg A PRACH occasion and a Msg A PUSCH resource, the Msg A PUSCH resource being based on the RB set configured for the Msg A PRACH and the one or more parameters for the Msg A PUSCH configuration, e.g., as described in connection with 708 in FIG. 7.

The apparatus may include additional components that perform each of the blocks of the algorithm in the flowchart of FIG. 7. As such, each block in the flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving a configuration for a Msg A PRACH over an RB set for a two-step RACH operation. The apparatus 802 includes means for receiving one or more parameters for a Msg A PUSCH configuration. The apparatus 802 includes means for transmitting a Msg A PUSCH in a configured Msg A PRACH occasion and a Msg A PUSCH resource, the Msg A PUSCH resource being based on the RB set configured for the Msg A PRACH and the one or more parameters for the Msg A PUSCH configuration. The apparatus 802 may further include means for identifying one or more resources for the Msg A PUSCH transmission based on the RB set configured for the Msg A PRACH and the one or more parameters for the Msg A PUSCH configuration. The means may be one or more of the components of the apparatus 802 configured to perform the functions recited by the means. As described herein, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
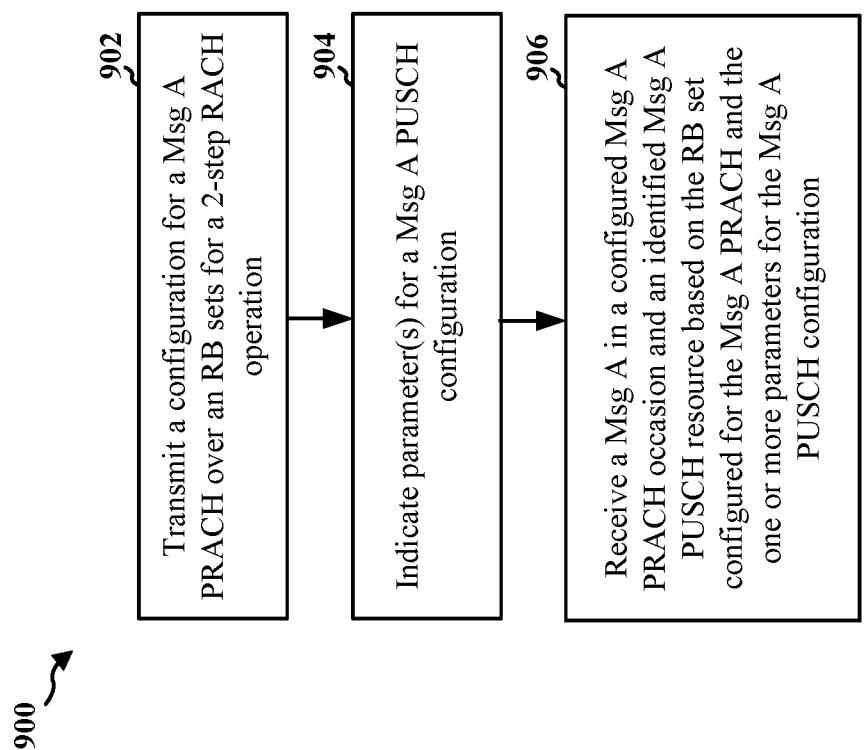
FIG. 9 is a flowchart of a method of wireless communication including reception of a Msg A PUSCH using resources based at least in part on an RB set configured for a Msg A PRACH.

FIG. 9 is a flowchart 900 of a method of wireless communication. The method may be performed by a base station (e.g., the base station 102, 180, 310, 404). The method may provide a more efficient manner for a base station to configure Msg A PUSCH resources with reduced signaling overhead in a manner that helps the UE receiving the configuration to avoid performing LBT in multiple RBs in order to transmit the Msg A PUSCH.

At 902, the base station transmits a configuration for a message A (Msg A) PRACH over an RB set for a two-step RACH operation. The transmission may be performed, e.g., by the Msg A PRACH configuration component 1040 via the transmission component 1034 and/or RF transceiver 1022. There may be multiple RB sets configured for a communication system, a carrier, or a bandwidth. One or more of the RB sets may be configured for a particular RACH occasion.

At 904, the base station indicates one or more parameters for a Msg A PUSCH configuration. The indication may be performed, e.g., by the Msg A PUSCH configuration component 1042 via the transmission component 1034 and/or RF transceiver 1022. In some aspects, the one or more parameters may include a starting interlace for the Msg A PUSCH, a number of interlaces for the Msg A PUSCH, and/or a number of FDM POs for the Msg A PUSCH for an interlaced waveform. In some aspects, the one or more parameters may include at least one of a starting offset for the Msg A PUSCH, a number of resource blocks, a guard band between POs, or a number of FDM POs for the Msg A PUSCH for a non-interlaced waveform.

At 906, the base station receives a Msg A in a configured Msg A PRACH occasion and an identified Msg A PUSCH resource based on the RB set configured for the Msg A PRACH and the one or more parameters for the Msg A PUSCH configuration. The reception may be performed, e.g., by the Msg A component 1044 via the reception component 1030 and/or the RF transceiver 1022 of the apparatus 1002. The Msg A PUSCH may comprise an interlaced waveform. The one or more parameters for the Msg A PUSCH configuration may include at least one of a starting interlace for the Msg A PUSCH, a number of interlaces for the Msg A PUSCH, or a number of FDM POs for the Msg A PUSCH. The starting interlace may be applied as the starting interlace in the RB set configured for the Msg A PRACH. The number of interlaces for the Msg A PUSCH may be applied as the number of interlaces in the RB set configured for the Msg A PRACH. The number of FDM POs for the Msg A PUSCH may be applied as the number of FDM POs as a number of interlace based POs in the RB set configured for the Msg A PRACH.

The Msg A PUSCH may comprise a non-interlaced waveform. The one or more parameters may include at least one of a starting offset for the Msg A PUSCH, a number of resource blocks, a guard band between POs, or a number of FDM POs for the Msg A PUSCH. The starting offset as a frequency start for the Msg A PUSCH may be applied from a lowest resource block in the RB set configured for the Msg A PRACH. The number of FDM POs for the Msg A PUSCH may be applied as a number of POs in the RB set configured for the Msg A PRACH.

Figure 10:
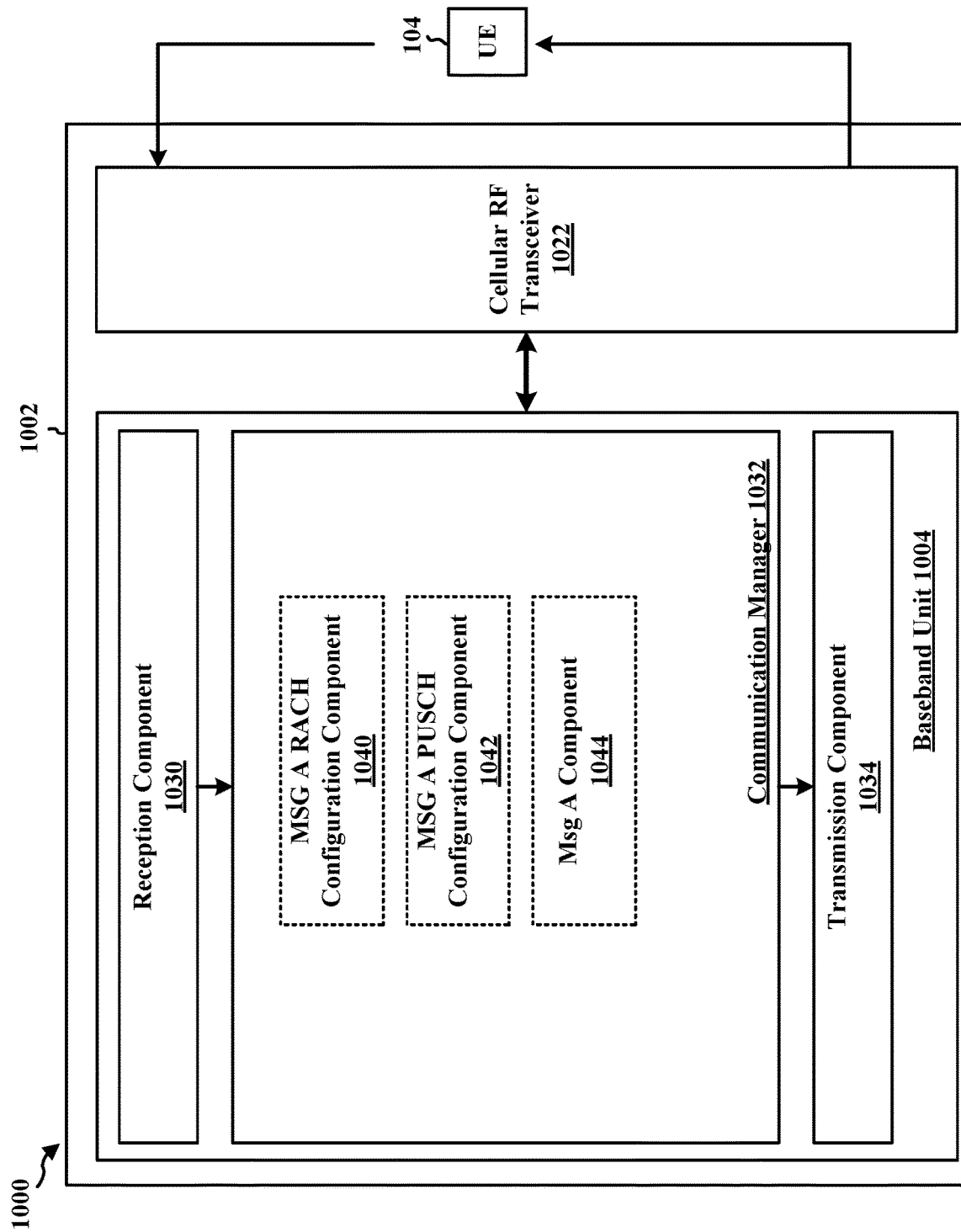
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus 802 may include a baseband unit 1004. The baseband unit 1004 may communicate through a RF transceiver 1022 with the UE 104. The RF transceiver 1022 may be a cellular RF transceiver. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described herein. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a Msg A PRACH configuration component 1040 configured to transmit a configuration for a Msg A PRACH over an RB set for a two-step RACH operation, e.g., as described in connection with 902 in FIG. 9. The communication manager 1032 further includes a Msg A PUSCH configuration component 1042 that is configured to indicate one or more parameters for a Msg A PUSCH configuration, e.g., as described in connection with 904 in FIG. 9. The communication manager 1032 further includes a Msg A component 1044 that is configured to receive a Msg A in a configured Msg A PRACH occasion and an identified Msg A PUSCH resource based on an RB set configured for the Msg A PRACH and the one or more parameters for the Msg A PUSCH configuration, e.g., as described in connection with 906 in FIG. 9.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for transmitting a configuration for a Msg A PRACH over an RB set for a two-step RACH operation. The apparatus 1002 includes means for indicating one or more parameters for a Msg A PUSCH configuration. The apparatus 1002 includes means for receiving a Msg A in a configured Msg A PRACH occasion and an identified Msg A PUSCH resource based on an RB set configured for the Msg A PRACH and the one or more parameters for the Msg A PUSCH configuration. The means may be one or more of the components of the apparatus 1002 configured to perform the functions recited by the means. As described herein, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising receiving a configuration for a Msg A PRACH over an RB set for a two-step RACH operation; receiving one or more parameters for a Msg A PUSCH configuration; and transmitting the Msg A PUSCH in a configured Msg A PRACH occasion and a Msg A PUSCH resource, the Msg A PUSCH resource being based on the RB set configured for the Msg A PRACH and the one or more parameters for the configuration for the Msg A PUSCH.

In aspect 2, the method of aspect 1 further includes that the Msg A PUSCH comprises an interlaced waveform, and the one or more parameters for the Msg A PUSCH configuration include at least one of: a starting interlace for the Msg A PUSCH, a number of interlaces for the Msg A PUSCH, or a number of FDM POs for the Msg A PUSCH.

In aspect 3, the method of aspect 1 or aspect 2 further includes that the one or more parameters for the Msg A PUSCH configuration include the starting interlace for the Msg A PUSCH, and the Msg A PUSCH resources is based on the starting interlace in the RB set configured for the Msg A PRACH.

In aspect 4, the method of any of aspects 1-3 further includes that the one or more parameters for the Msg A PUSCH configuration include the number of interlaces for the Msg A PUSCH, and the Msg A PUSCH resource is based on application of the number of interlaces in the RB set configured for the Msg A PRACH.

In aspect 5, the method of any of aspects 1-4 further includes that the one or more parameters for the Msg A PUSCH configuration include the number of FDM POs for the Msg A PUSCH, and the Msg A PUSCH resource is based on application of the number of FDM POs as a number of interlace based POs in the RB configured for the Msg A PRACH.

In aspect 6, the method of aspect 1 further includes that the Msg A PUSCH comprises a non-interlaced waveform, and the one or more parameters include at least one of: a starting offset for the Msg A PUSCH, a number of resource blocks, a guard band between POs, or a number of FDM POs for the Msg A PUSCH.

In aspect 7, the method of aspect 6 further includes that the one or more parameters for the Msg A PUSCH configuration include the starting offset for the Msg A PUSCH, and the Msg A PUSCH resource is based on a frequency start for the Msg A PUSCH from a lowest resource block in the RB set configured for the Msg A PRACH.

In aspect 8, the method of aspect 6 or aspect 7 further includes that the one or more parameters for the Msg A PUSCH configuration include the number of FDM POs for the Msg A PUSCH and the Msg A PUSCH resource is based on application of a number of POs in the RB set configured for the Msg A PRACH.

Aspect 9 is an apparatus for wireless communication at a UE comprising means to perform the method of any of aspects 1-8.

In aspect 10, the apparatus of aspect 9 further includes at least one antenna and a transceiver coupled to the at least one antenna.

Aspect 11 is an apparatus for wireless communication at a UE comprising a memory and at least one processor coupled to the memory, the memory and the at least one processor configured to perform the method of any of aspects 1-8.

In aspect 12, the apparatus of aspect 10 further includes at least one antenna and a transceiver coupled to the at least one antenna and the at least one processor.

Aspect 13 is a computer-readable medium storing computer executable code for wireless communication at a UE, where the code when executed by a processor causes the processor to implement the method of any of aspects 1-8.

Aspect 14 is a method of wireless communication at a base station, comprising: transmitting a configuration for a Msg A PRACH over an RB set for a two-step RACH operation; indicating one or more parameters for a Msg A PUSCH configuration; and receiving a Msg A in a configured Msg A PRACH occasion and an identified Msg A PUSCH resource based on an RB set configured for the Msg A PRACH and the one or more parameters for the Msg A PUSCH configuration.

In aspect 15, the method of aspect 14 further includes that the Msg A PUSCH comprises an interlaced waveform, and the one or more parameters for the Msg A PUSCH configuration include at least one of: a starting interlace for the Msg A PUSCH, a number of interlaces for the Msg A PUSCH, or a number of FDM POs for the Msg A PUSCH.

In aspect 16, the method of aspect 15 further includes that the one or more parameters for the Msg A PUSCH configuration include the starting interlace for the Msg A PUSCH for application as the starting interlace in the RB set configured for the Msg A PRACH.

In aspect 17, the method of aspect 15 or 16 further includes that the one or more parameters for the Msg A PUSCH configuration include the number of interlaces for the Msg A PUSCH for application as the number of interlaces in the RB set configured for the Msg A PRACH.

In aspect 18, the method of any of aspects 15-17 further includes that the one or more parameters for the Msg A PUSCH configuration include the number of FDM POs for the Msg A PUSCH for application as the number of FDM POs as a number of interlace based POs in the RB set configured for the Msg A PRACH.

In aspect 19, the method of aspect 14 further includes that a Msg A PUSCH comprises a non-interlaced waveform, and the one or more parameters include at least one of: a starting offset for the Msg A PUSCH, a number of resource blocks, a guard band between POs, or a number of FDM POs for the Msg A PUSCH.

In aspect 20, the method of aspect 19 further includes that the one or more parameters for the Msg A PUSCH configuration include the starting offset for the Msg A PUSCH for application as a frequency start for the Msg A PUSCH from a lowest resource block in the RB set configured for the Msg A PRACH.

In aspect 21, the method of aspect 19 or aspect 20 further includes that the one or more parameters for the Msg A PUSCH configuration include the number of FDM POs for the Msg A PUSCH for application as a number of POs in the RB set configured for the Msg A PRACH.

Aspect 22 is an apparatus for wireless communication at a base station comprising means to perform the method of any of aspects 14-21.

In aspect 23, the apparatus of aspect 22 further includes at least one antenna and a transceiver coupled to the at least one antenna.

Aspect 24 is an apparatus for wireless communication at a base station comprising a memory and at least one processor coupled to the memory, the memory and the at least one processor configured to perform the method of any of aspects 14-21.

In aspect 25, the apparatus of aspect 24 further includes at least one antenna and a transceiver coupled to the at least one antenna and the at least one processor.

Aspect 26 is a computer-readable medium storing computer executable code for wireless communication at a base station, where the code when executed by a processor causes the processor to implement the method of any of aspects 14-21.

What is claimed is:

1. A method of wireless communication at a user equipment (UE), comprising:
    receiving a configuration for a message A (Msg A) physical random access channel (PRACH) over a resource block (RB) set for a two-step random access channel (RACH) operation;
    receiving one or more parameters for a Msg A physical uplink shared channel (PUSCH) configuration; and
    transmitting a Msg A PUSCH in a configured Msg A PRACH occasion and a Msg A PUSCH resource, the Msg A PUSCH resource being based on the RB set configured for the Msg A PRACH and the one or more parameters for the Msg A PUSCH configuration.

2. The method of claim 1, wherein the Msg A PUSCH comprises an interlaced waveform and the one or more parameters for the Msg A PUSCH configuration include a starting interlace for the Msg A PUSCH that the UE applies as the starting interlace in the RB set configured for the Msg A PRACH.

3. The method of claim 1, wherein the Msg A PUSCH comprises an interlaced waveform and the one or more parameters for the Msg A PUSCH configuration include a number of interlaces for the Msg A PUSCH that the UE applies as the number of interlaces in the RB set configured for the Msg A PRACH.

4. The method of claim 1, wherein the Msg A PUSCH comprises an interlaced waveform and the one or more parameters for the Msg A PUSCH configuration include a number of frequency division multiplexed (FDM) PUSCH occasions (POs) for the Msg A PUSCH that the UE applies as the number of FDM POs as a number of interlace based POs in the RB configured for the Msg A PRACH.

5. The method of claim 1, wherein the Msg A PUSCH comprises a non-interlaced waveform and the one or more parameters for the Msg A PUSCH configuration include a starting offset for the Msg A PUSCH that the UE applies as a frequency start for the Msg A PUSCH from a lowest resource block in the RB set configured for the Msg A PRACH.

6. The method of claim 1, wherein the Msg A PUSCH comprises a non-interlaced waveform and the one or more parameters for the Msg A PUSCH configuration include a number of frequency division multiplexed (FDM) PUSCH occasions (POs) for the Msg A PUSCH that the UE applies as a number of POs in the RB set configured for the Msg A PRACH.

7. An apparatus for wireless communication at a user equipment (UE), comprising:
    memory; and
    at least one processor coupled to the memory and configured to cause the UE to:
        receive a configuration for a message A (Msg A) physical random access channel (PRACH) over a resource block (RB) set for a two-step random access channel (RACH) operation;
        receive one or more parameters for a Msg A physical uplink shared channel (PUSCH) configuration; and
        transmit the Msg A PUSCH in a configured Msg A PRACH occasion and a Msg A PUSCH resource, the Msg A PUSCH resource being based on the RB set configured for the Msg A PRACH and the one or more parameters for the configuration for the Msg A PUSCH.

8. The apparatus of claim 7, wherein the Msg A PUSCH comprises an interlaced waveform, and the one or more parameters for the Msg A PUSCH configuration include at least one of:
    a starting interlace for the Msg A PUSCH to be applied as the starting interlace in the RB set configured for the Msg A PRACH,
    a number of interlaces for the Msg A PUSCH to be applied as the number of interlaces in the RB set configured for the Msg A PRACH, or
    a number of frequency division multiplexed (FDM) PUSCH occasions (POs) for the Msg A PUSCH to be applied as the number of FDM POs in the RB set configured for the Msg A PRACH.

9. The apparatus of claim 8, wherein the one or more parameters for the Msg A PUSCH configuration include the starting interlace for the Msg A PUSCH, and the Msg A PUSCH resources is based on the starting interlace in the RB set configured for the Msg A PRACH.

10. The apparatus of claim 8, wherein the one or more parameters for the Msg A PUSCH configuration include the number of interlaces for the Msg A PUSCH, and the Msg A PUSCH resource is based on application of the number of interlaces in the RB set configured for the Msg A PRACH.

11. The apparatus of claim 8, wherein the one or more parameters for the Msg A PUSCH configuration include the number of FDM POs for the Msg A PUSCH, and the Msg A PUSCH resource is based on application of the number of FDM POs as a number of interlace based POs in the RB configured for the Msg A PRACH.

12. The apparatus of claim 7, wherein the Msg A PUSCH comprises a non-interlaced waveform, and the one or more parameters include at least one of:
    a starting offset for the Msg A PUSCH to be applied from a lowest resource block in the RB set configured for the Msg A PRACH,
    or
    a number of frequency division multiplexed (FDM) POs for the Msg A PUSCH to be applied as a number of POs in the RB set configured for the Msg A PRACH.

13. The apparatus of claim 12, wherein the one or more parameters for the Msg A PUSCH configuration include the starting offset for the Msg A PUSCH, and the Msg A PUSCH resource is based on a frequency start for the Msg A PUSCH from the lowest resource block in the RB set configured for the Msg A PRACH.

14. The apparatus of claim 12, wherein the one or more parameters for the Msg A PUSCH configuration include the number of FDM POs for the Msg A PUSCH and the Msg A PUSCH resource is based on application of the number of POs in the RB set configured for the Msg A PRACH.

15. The apparatus of claim 12, wherein the one or more parameters further include at least one of:
    a number of resource blocks, or
    a guard band between PUSCH occasions (POs).

16. The apparatus of claim 7, further comprising:
    an antenna; and
    a transceiver coupled to the antenna and the at least one processor.

17. A method of wireless communication at a base station, comprising:
- transmitting a configuration for a message A (Msg A) physical random access channel (PRACH) over a resource block (RB) sets for a two-step random access channel (RACH) operation;
- indicating one or more parameters for a Msg A physical uplink shared channel (PUSCH) configuration; and
- receiving a Msg A in a configured Msg A PRACH occasion and an identified Msg A PUSCH resource based on an RB set configured for the Msg A PRACH and the one or more parameters for the Msg A PUSCH configuration.

18. The method of claim 17, wherein the Msg A PUSCH comprises an interlaced waveform and the one or more parameters for the Msg A PUSCH configuration include a starting interlace for the Msg A PUSCH for application as the starting interlace in the RB set configured for the Msg A PRACH.

19. The method of claim 17, wherein the Msg A PUSCH comprises an interlaced waveform and the one or more parameters for the Msg A PUSCH configuration include a number of interlaces for the Msg A PUSCH for application as the number of interlaces in the RB set configured for the Msg A PRACH.

20. The method of claim 17, wherein the Msg A PUSCH comprises an interlaced waveform and the one or more parameters for the Msg A PUSCH configuration include a number of frequency division multiplexed (FDM) PUSCH occasions (POs) for the Msg A PUSCH for application as the number of FDM POs as a number of interlace based POs in the RB set configured for the Msg A PRACH.

21. The method of claim 17, wherein the Msg A PUSCH comprises a non-interlaced waveform, and the one or more parameters for the Msg A PUSCH configuration include a starting offset for the Msg A PUSCH for application as a frequency start for the Msg A PUSCH from a lowest resource block in the RB set configured for the Msg A PRACH.

22. The method of claim 17, wherein the Msg A PUSCH comprises a non-interlaced waveform, and the one or more parameters for the Msg A PUSCH configuration include a number of frequency division multiplexed (FDM) PUSCH occasions (POs) for the Msg A PUSCH for application as a number of POs in the RB set configured for the Msg A PRACH.

23. An apparatus for wireless communication at a base station, comprising:
- memory; and
- at least one processor coupled to the memory and configured to cause the base station to:
  - transmit a configuration for a message A (Msg A) physical random access channel (PRACH) over a resource block (RB) sets for a two-step random access channel (RACH) operation;
  - indicate one or more parameters for a Msg A physical uplink shared channel (PUSCH) configuration; and
  - receive a Msg A in a configured Msg A PRACH occasion and an identified Msg A PUSCH resource based on an RB set configured for the Msg A PRACH and the one or more parameters for the Msg A PUSCH configuration.

24. The apparatus of claim 23, wherein a Msg A PUSCH comprises an interlaced waveform, and the one or more parameters for the Msg A PUSCH configuration include at least one of:
- a starting interlace for the Msg A PUSCH to be applied as the starting interlace in the RB set configured for the Msg A PRACH,
- a number of interlaces for the Msg A PUSCH to be applied as the number of interlaces in the RB set configured for the Msg A PRACH, or
- a number of frequency division multiplexed (FDM) PUSCH occasions (POs) for the Msg A PUSCH to be applied as the number of FDM POs in the RB set configured for the Msg A PRACH.

25. The apparatus of claim 24, wherein the one or more parameters for the Msg A PUSCH configuration include the starting interlace for the Msg A PUSCH for application as the starting interlace in the RB set configured for the Msg A PRACH.

26. The apparatus of claim 24, wherein the one or more parameters for the Msg A PUSCH configuration include the number of interlaces for the Msg A PUSCH for application as the number of interlaces in the RB set configured for the Msg A PRACH.

27. The apparatus of claim 24, wherein the one or more parameters for the Msg A PUSCH configuration include the number of FDM POs for the Msg A PUSCH for application as the number of FDM POs as a number of interlace based POs in the RB set configured for the Msg A PRACH.

28. The apparatus of claim 23, wherein a Msg A PUSCH comprises a non-interlaced waveform, and the one or more parameters include at least one of:
- a starting offset for the Msg A PUSCH to be applied from a lowest resource block in the RB set configured for the Msg A PRACH,
- or
- a number of frequency division multiplexed (FDM) POs for the Msg A PUSCH to be applied as a number of POs in the RB set configured for the Msg A PRACH.

29. The apparatus of claim 28, wherein the one or more parameters for the Msg A PUSCH configuration include the starting offset for the Msg A PUSCH for application as a frequency start for the Msg A PUSCH from the lowest resource block in the RB set configured for the Msg A PRACH.

30. The apparatus of claim 28, wherein the one or more parameters for the Msg A PUSCH configuration include the number of FDM POs for the Msg A PUSCH for application as the number of POs in the RB set configured for the Msg A PRACH.

31. The apparatus of claim 28, wherein the one or more parameters further include at least one of:
- a number of resource blocks, or
- a guard band between PUSCH occasions (POs).

32. The apparatus of claim 23, further comprising:
- an antenna; and
- a transceiver coupled to the antenna and the at least one processor.

* * * * *